F. A. CLARK.
GRATER.
APPLICATION FILED JUNE 22, 1915.
1,160,043.
Patented Nov. 9, 1915.
2 SHEETS—SHEET 1.
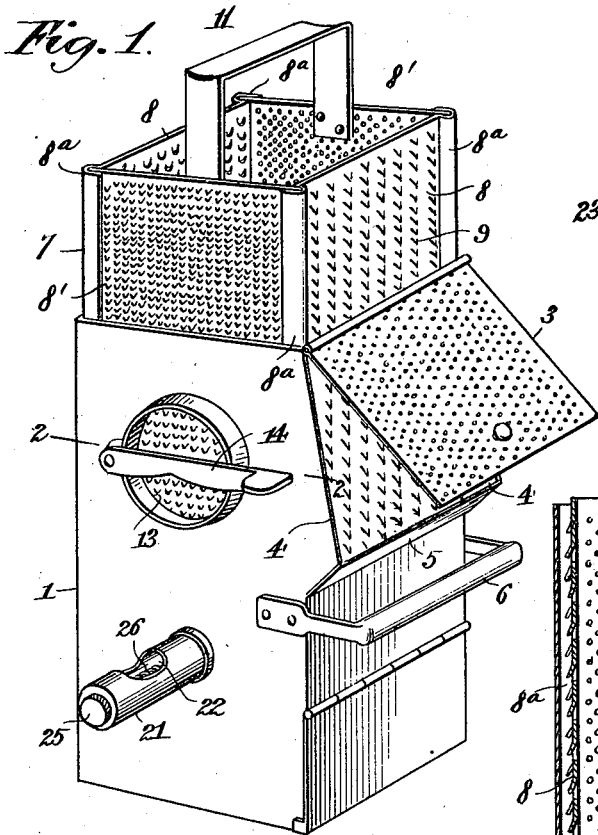
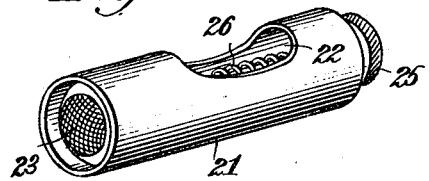
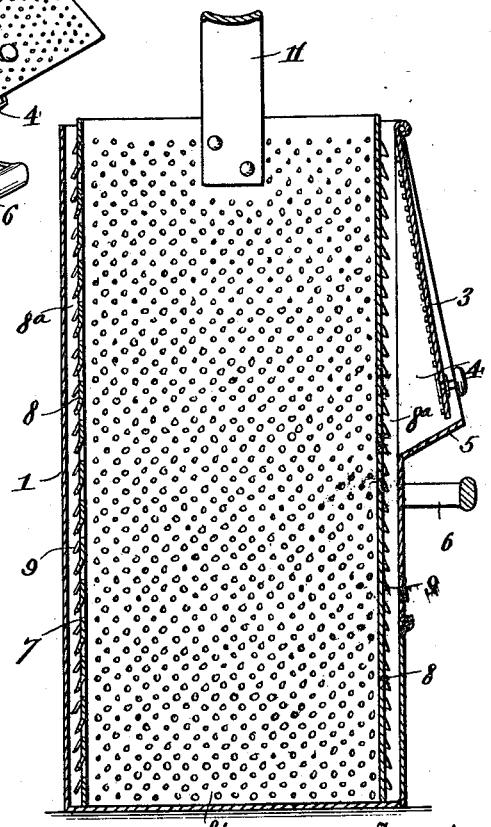
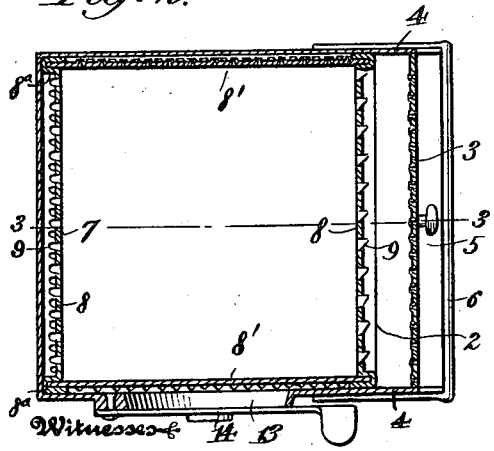
Witnesses:
C. Feinle, Jr.
Inventor,
F. A. Clark.
By Victor J. Evans,
Attorney.

F. A. CLARK.
GRATER.
APPLICATION FILED JUNE 22, 1915.
1,160,043.
Patented Nov. 9, 1915.
2 SHEETS—SHEET 2.
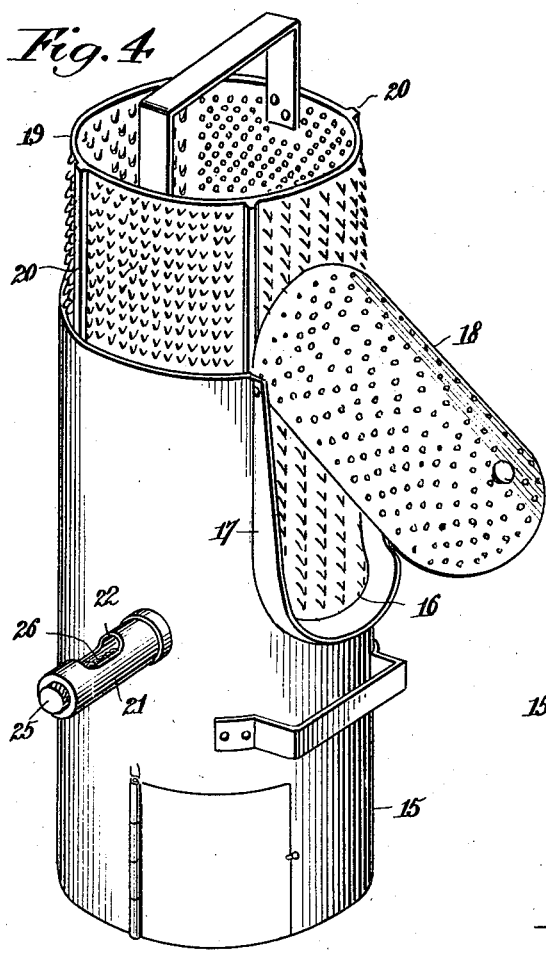
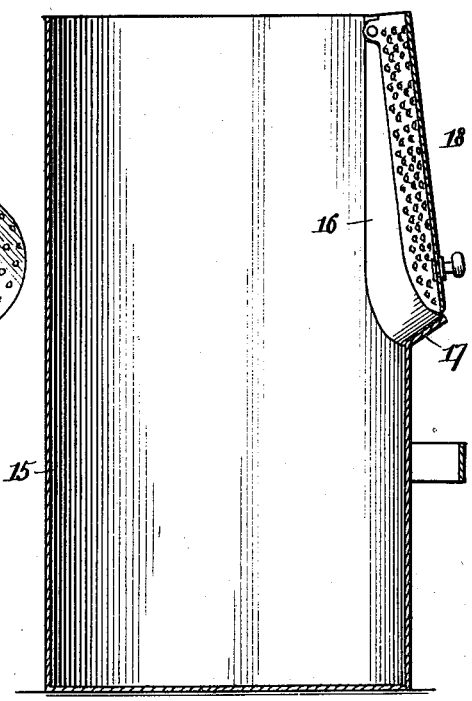
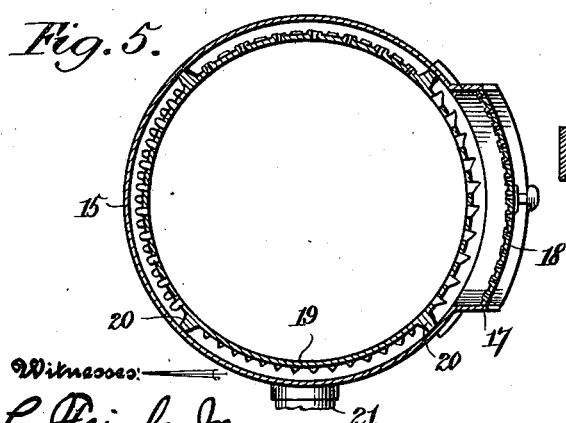
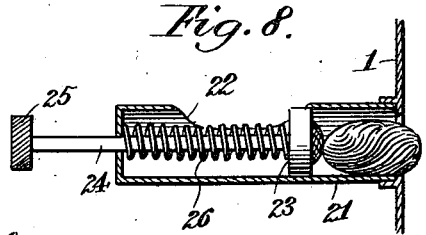
Inventor,
F. A. Clark.
By Victor J. Evans,
Attorney

UNITED STATES PATENT OFFICE.

FREDERICK A. CLARK, OF CAPE CHARLES, VIRGINIA.

GRATER.

1,160,043.   Specification of Letters Patent.   Patented Nov. 9, 1915.

Application filed June 22, 1915. Serial No. 35,669.

*To all whom it may concern:*

Be it known that I, FREDERICK A. CLARK, a citizen of the United States, residing at Cape Charles, in the county of Northampton and State of Virginia, have invented new and useful Improvements in Graters, of which the following is a specification.

My invention relates to graters and has for its prime object the provision of a grating member having a plurality of serving surfaces, any one of which may be used, as the case may demand to produce a fine or coarse material.

Another object of my device is the provision of a grating member which is movably associated with the casing, the casing carrying the material to be grated and keeping the same in contact with the grating member.

Another object of my device is to provide a grater of such a construction as to eliminate the necessity of holding the material to be grated with the fingers, and at the same time to permit all of the material to be grated.

A further object of my device is to provide a grater capable of being disassembled so as to facilitate easy cleaning of its parts or the substitution of new parts in case they may become worn.

In the accompanying drawings, forming a part of the specification: Figure 1 is a perspective view of my grating device, the grating member being partly withdrawn from the casing. Fig. 2 is a horizontal section taken through the line 2—2 of Fig. 1. Fig. 3 is a vertical section taken through the line 3—3 of Fig. 2. Fig. 4 is a perspective view of a modified form of my grating device, the grating member being partly withdrawn from the casing. Fig. 5 is a horizontal section taken through the line 5—5 of Fig. 4. Fig. 6 is a central vertical section of the casing shown in Fig. 4. Fig. 7 is a perspective view of my feed attachment. Fig. 8 is a vertical section of the same.

Referring to the drawings, 1 designates a rectangular casing, one side of which is provided with a rectangular opening 2 adjacent its upper end. Pivotally connected to the upper wall of the opening 2 is a plate or presser member 3, the inner side of which is roughened to provide an efficient gripping surface. Attached to the side walls of the opening and projecting from the casing are tapering flanges 4 merging toward the upper wall of the opening 2. The flanges 4 are adapted to receive the presser member 3, the vertical edges of the presser member contacting with the inner sides of the flanges. This structure causes the flanges to act as guides for the presser member 3, when the latter is being introduced into the opening 2. Secured to the lower wall of the opening 2, is a vertical inclined shelf 5, the opposite ends of which engage the inner faces of the flanges 4, so as to make a tight connection therewith. These flanges 4, and the shelf 5, coöperate in preventing any of the grated material in falling from the casing during the grating operation. It will be noted that, owing to the inclination of the shelf 5, any grated material that may fall thereon will be gravitated into the casing. Disposed below the opening 2, adjacent the lower wall thereof, is a U-shaped handle 6, having its parallel arms secured to the opposite sides of the casing and the connecting portion straddling the adjacent side of the casing.

7 designates a rectangular grating member comprising side plate 8—8 which are provided with grating surfaces 9, and side plates 8′—8′, formed with grating surfaces respectively. The side plates 8—8 are formed to provide guide-ways 8ª on the longitudinal edges thereof. The guide-ways 8ª are U-shaped in cross section, and are adapted to slidably receive the side plates 8′—8′ thereby forming the rectangular grating member as shown.

It will be noted that the plates 8′—8′ are frictionally held within the guide-ways 8ª thereby keeping the grating member in its assembled form.

From this structure it will be seen that the grating surfaces are kept in spaced relation to the inner walls of the casing thereby permitting the grated material to fall to the bottom of the casing. Attached to the said plates 8—8 which carry the guide-ways 8ª are the parallel arms of the U-shaped handle 11, the horizontal portion thereof spanning the upper end of the grating member.

From the foregoing description it will be seen that the material to be grated is placed within the opening 2, of the casing and the grating member 7, is reciprocated within the casing by the handle 6, whereby said material is grated, the fineness or coarseness of which depending upon which grating surface is presented to the opening. After the material to be grated has been placed within the opening 2 the presser member 3 is swung down so as to rest against the material. Pressure is then exerted by the operator upon the presser member, causing the material to engage the grating surface of the member 7. This presser member 3 eliminates the necessity of using the fingers to hold the material in engagement with the grating surface and prevents the accidental injury of the operator's fingers. It is of course understood that the grating member may be removed from the casing and then turned and replaced so as to present a different surface to the opening.

In Fig. 4, I have shown a cylindrical form of my grater, comprising the casing 15 provided with a U-shaped opening 16, adjacent the upper end thereof. Extending outwardly from the walls of the opening 16, is a flange 17 which is U-shaped and has its opposite ends tapered as shown. The upper wall of the opening 16, is provided with a hingedly connected presser member 18, which is of a shape corresponding to that of the opening and which is adapted to work therein as described in my preferred form. Adapted to slide within the casing 15, is a cylindrical grating member 19, which is formed to provide longitudinally extending beads 20, on the side wall thereof. These beads 20 are substantially U-shaped in cross section and are spaced apart about the grating member 19 and are co-extensive with such member.

In order to grate small material such as nutmegs I have provided one side of the casing 1, with a small opening 13, which receives the nutmegs. The nutmegs are securely held within the opening by a gripping arm 14 which is pivotally mounted upon the casing and is adapted to span the opening when in active position.

In Fig. 7 I have shown a receptacle for nutmegs which is adapted to be attached to an opening by any suitable means. This receptacle comprises a cylindrical casing having one of its ends closed. The side wall thereof is provided with a longitudinal opening adapted to permit the introduction of the nutmegs into the casing. Slidably mounted within the casing 21 is a plunger 23 which is provided with a stem 24 extending through the closed end of the casing and having its outer extremity provided with a handle 25. Mounted upon the stem 24 is a helical spring 26, one end of which bears against the end of the casing, the opposite end contacting the plunger and exerting its tension to force the plunger to the open end of the casing.

From this structure it is apparent that when the plunger 23 is drawn back toward the closed end of the casing by the handle 25 on the stem 24, the helical spring 26 will be compressed. The nutmegs or other material of a similar size are then introduced into the casing through the opening 22, and lie in the path of the plunger 23. The stem 24 is then released and under the action of the spring 26 the plunger 23 is moved forward, causing the nutmegs to be thrown in contact with the grating surface.

From the foregoing description, taken in connection with the drawings, the construction and operation of the invention will be readily understood without requiring a more extended explanation.

Various changes in the form, proportion, and minor details of construction may be resorted to without departing from the principle or sacrificing any of the advantages of this invention as claimed.

What I claim is:—

1. A grater comprising a casing, a grating member movable within said casing, said grating member comprising side plates, certain of said plates having the longitudinal edges thereof bent to form guide-ways, said guide-ways receiving the longitudinal edges of the remaining plate and serving to keep all of the plates in spaced relation to the inner wall of the casing.

2. A grater comprising a casing and having one side thereof provided with an opening, a gravity presser member secured to said casing and disposed over said opening, and a grating member movable within said casing and comprising a plate, certain of said plates having the longitudinal edges thereof offset and bent to form guide-ways, and receiving the remainder of the plates whereby all of said plates will be held in spaced relation to the inner wall of the casing.

3. A grater comprising a casing, a grating member movable within said casing, longitudinally extending beads formed on the outer wall of said grating member and dividing said member into a plurality of different grating surfaces, said bead adapted to contact with the inner wall of said casing whereby the grating member will be held in spaced relation with the inner wall of the casing.

In testimony whereof I affix my signature in presence of two witnesses.

FREDERICK A. CLARK.

Witnesses:
W. T. RICHARDSON,
B. D. DRYDEN.